United States Patent [19]
Frabotta et al.

[11] Patent Number: 4,765,673
[45] Date of Patent: Aug. 23, 1988

[54] WINDSHIELD REVEAL MOLDING

[75] Inventors: Peter W. Frabotta, Allen Park; Steven C. Lang, Fraser, both of Mich.

[73] Assignee: General Motors Corporation, Detroit, Mich.

[21] Appl. No.: 45,398

[22] Filed: May 4, 1987

[51] Int. Cl.$^4$ .................. B60R 13/06; B60R 13/07
[52] U.S. Cl. ...................... 296/93; 296/84 D; 296/201; 296/208; 52/208; 52/400; 52/716
[58] Field of Search ............ 296/84 A, 84 D, 93, 296/201, 84 R, 208; 277/189; 52/208, 400, 716, 823

[56] References Cited

U.S. PATENT DOCUMENTS

| | | | |
|---|---|---|---|
| 1,248,285 | 11/1917 | Dillingham | 296/93 |
| 2,138,374 | 11/1938 | Edwards | 296/93 |
| 3,177,534 | 4/1965 | Millhouse et al. | 52/394 |
| 3,851,432 | 12/1974 | Griffin | 52/400 |
| 4,092,813 | 6/1978 | Eggert | 52/716 X |
| 4,165,119 | 8/1979 | Hedeen et al. | 296/93 |
| 4,527,807 | 7/1985 | Urbanick | 277/189 |

FOREIGN PATENT DOCUMENTS

| | | | |
|---|---|---|---|
| 0117816 | 9/1984 | European Pat. Off. | 296/201 |
| 3333672 | 4/1985 | Fed. Rep. of Germany | 296/84 A |
| 2520428 | 7/1983 | France | 52/208 |
| 730661 | 5/1955 | United Kingdom | 296/84 D |

Primary Examiner—Dennis H. Pedder
Attorney, Agent, or Firm—Charles E. Leahy

[57] ABSTRACT

A window reveal molding includes a C shaped inner member of high durometer plastic material including spaced apart legs which are closer together than the thickness of the window panel so the legs forcibly grip the opposed faces of the window panel. The molding also includes an outer member of low durometer plastic material which is coextruded onto the inner member. The outer member has a C shaped channel portion including legs encapsulating the legs of the inner member and extending beyond into sealing engagement with the window panel. The outer member also has a continuous flexible lip extruded integral therewith and extending therefrom into engagement with either an outer body panel or a recessed portion of a body panel flange when the window panel with the molding attached thereto is installed in the window opening so that the flexible lip bridges across the space between the window panel and the body panel. The inner member also includes a base connecting the legs and spaced from the edge of the window panel to define therebetween a cavity for receiving a bonding and sealing material. The flexible lip and the body panel define a water conducting drain channel between the molding and the vehicle body panel.

1 Claim, 1 Drawing Sheet

WINDSHIELD REVEAL MOLDING

The invention relates to a window reveal molding for a motor vehicle body and more particularly to a decorative molding for concealing a space between a vehicle body panel and a window panel adhesively secured in a flanged opening of the vehicle body panel.

BACKGROUND OF THE INVENTION

It is known to conceal the space between a window panel and a vehicle body panel by use of a metal molding which bridges the space and is attached to the vehicle body by a plurality of clips spaced along the length of the molding and engaged upon studs welded to the body panel.

It is also known to provide a plastic extruded molding having a decorative portion which overlies the window panel and the body panel and is inserted into a bead of curable adhesive to attach the molding to the body panel and the glass. Examples of such window reveal moldings include U.S. Pat. No. 4,165,119, Hedeen et al, Window Reveal Molding, and U.S. Pat. No. 3,851,432, Griffin, Motor Vehicle Window Molding.

It would be desirable to provide a window reveal molding which is mounted on the edge of the window glass prior to the glass being affixed to the vehicle body and independently of the adhesive which adheres the glass to the vehicle body.

SUMMARY OF THE INVENTION

According to the present invention a new and improved plastic reveal molding includes a C shaped inner member of high durometer plastic material including spaced apart legs which are closer together than the thickness of the window panel so the legs forcibly grip the opposed faces of the window panel. The molding also includes an outer member of low durometer plastic material which is coextruded onto the inner member. The outer member has a C shaped channel portion including legs encapsulating the legs of the inner member and extending beyond into sealing engagement with the window panel. The outer member also includes a continuous flexible lip extruded integral therewith and extending therefrom into engagement with the body panel flange when the window panel with the molding attached thereto is installed within the window opening so that the flexible lip bridges across the space between the window panel and the body panel. The inner member also includes a base connecting the legs and spaced from the edge of the window panel to define therebetween a cavity for receiving a bonding and sealing material. The flexitle lip bridging across the space between the window panel and the body panel defines a water conducting drain channel between the molding and the vehicle body panel.

BRIEF DESCRIPTION OF THE DRAWINGS

These and other objects features and advantages of the invention will become apparent upon consideration of the specification and the appended drawings in which.

DESCRIPTION OF THE PREFERRED EMBODIMENT

Figure 1:
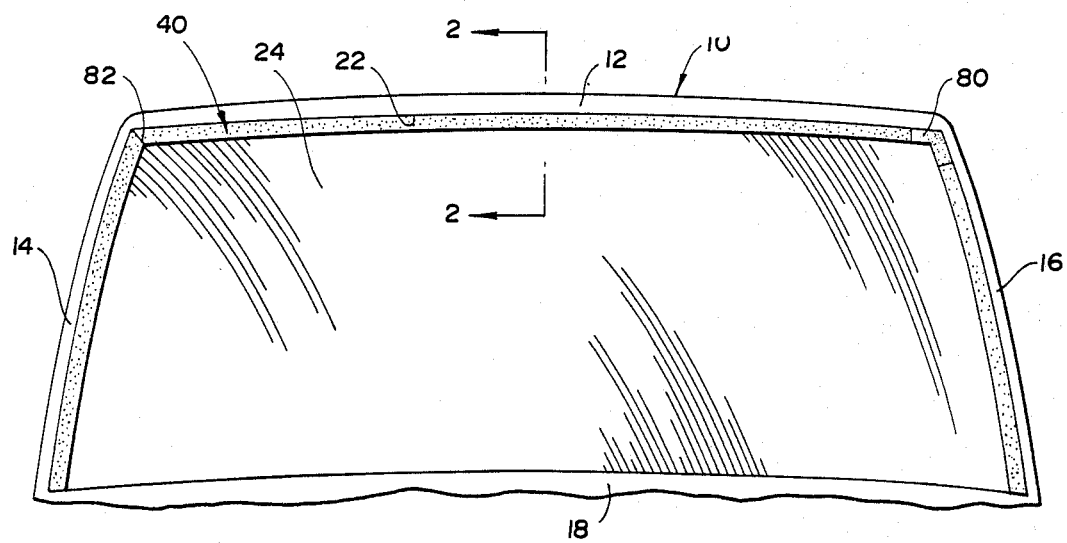
FIG. 1 is a front perspective view of a vehicle body having a window molding according to the invention.

Referring to the drawings a vehicle body 10 includes a conventional roof structure 12, roof pillars 14 and 16, and a cowl structure 18 which cooperate to define a conventional window opening 22 which is closed by a fixed windshield glass or window panel 24.

Figure 2:
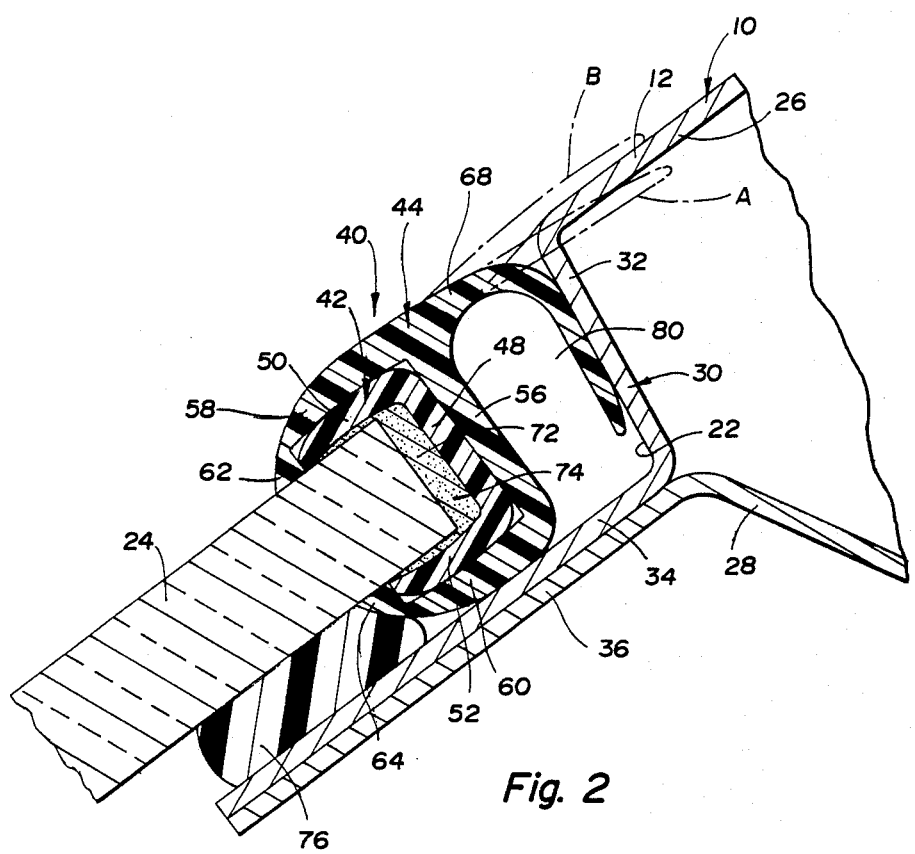
FIG. 2 is a cross-sectional view taken in the direction of arrows 2—2 of FIG. 1.

Referring to FIG. 2 it will be seen that the roof structure 12 includes an outer panel 26 and an inner panel 28. The outer panel 26 includes an inwardly offset flange structure 30 including an inwardly extending wall 32 which is perpendicular to the surface of the outer panel 26 and a parallel extending wall 34 which extends generally forwardly and parallel to the window panel 24 and the surface of the outer panel 26. The roof inner panel 28 has a wall 36 which abuts with the wall 34 of the outer panel 26 and is pinch welded thereto. The roof pillars 14 and 16 each have conventional inwardly offset flanges similar to those of the roof structure and cooperate therewith to provide the flanged window opening 22.

A window reveal molding generally indicated at 40 is provided to conceal the space between the window panel 24 and the flange structure 30. As best seen in FIG. 2, the reveal molding 40 is a dual durometer extruded plastic construction including a C shaped inner member 42 and an outer member 44. The C shaped inner member 42 is extruded of a high durometer plastic such as polyvinyl chloride. The inner member 42 includes a base wall 48 and spaced apart legs 50 and 52. The spacing between the legs is less than the thickness of the glass. The outer member 44 is coextruded integrally with the inner member 42 but is of a low durometer PVC. The outer member 44 includes a C shaped channel portion including a base 56 and legs 58 and 60. The legs 58 and 60 reach beyond the legs 50 and 52 of the inner channel 42 and end in tips 62 and 64 which sealingly engage against the faces of the window panel 24.

The outer member 44 also includes an integrally extruded continuous flexible lip portion 68 which extends outwardly from the upper leg 58 as shown in the phantom line indicated position designated A in FIG. 2.

It will be understood that the molding 40 is applied to the window panel 24 prior to the window panel 24 being installed in the window opening 22. This installation of the molding 40 to the window panel 24 may be made by the window panel manufacturer or, the molding may be applied to the edge of the glass in the automobile assembly plant. In either case, the molding 40 is installed upon the edge of the window panel 24 by spreading the legs 50 and 52 of the inner member 42 and pushing the molding onto the edge of the glass. In addition, as seen in FIG. 2 the cavity 72 defined between the edge of the window panel 24 and the base wall 48 of the inner member 42 is preferably filled with a suitable bonding and sealing material such as a butyl adhesive 74. Accordingly it will be understood that the inner member 42 is effectively attached to the edge of the window panel 24 by the interference fit of the legs 50 and 52 against the proposed inner and outer faces of the window panel 24. Furthermore the presence of the bonding and sealing material 74 in the cavity 72 further attaches the molding 40 to the window panel.

The window panel 24 is installed in the window opening 22 and attached to the flange 34 by a bead of urethane adhesive 76. Upon the installation of the window panel 24 the flexible lip 68 is preferably folded inwardly with respect to the window opening 22 so that the flexible lip 68 engages with the wall 32 of the outer panel flange 30. Alternatively, the flexible lip 68 may extend coplanar with the window panel and overlie and engage the face of the outer panel 26 as shown in the phantom line indicated position designated B. In either case, as seen in FIG. 2, the flexible lip 68 cooperates with the base 56 of the outer member 44 and with the flange structure of the outer panel 12 to define a water drain channel 80 which extends continuously around the windshield opening. Accordingly any fluid which may enter between the reveal molding 40 and the outer panel 26 is communicated through the water drain channel 80 down the pillars where it is expelled from the vehicle.

Referring again to FIG. 2 it will be understood that the reveal molding 40 is adjustable in the sense that the extent to which the molding is pushed onto the edge of the glass may be varied with the result that the width of the cavity 72 will vary. This feature is important because it can compensate for variations in the size of the window panel 24. Accordingly it may be desirable to employ a measuring fixture to determine the position of the molding 40 on the window panel 24 so that each assembly of a window panel 24 and a molding 40 will be of the same outer dimension irrespective of variations in the size of the window panel 24.

Referring again to FIG. 1 it is seen that the molding 44 may include a separately molded corner section 80 adapted to fit closely with a sharp corner of the window panel 24. Alternatively, as shown at the other corner of the window panel 24, the molding 40 may simply be mitered at 82 in order to wrap around the window panel 24. Furthermore, if the window panel has a large radius of curvature the molding 40 may simply be wrapped around the large radius curvature.

It will be understood that the durometer of the plastic for the inner member is selected to provide and assure a desired level of rigidity and interference fit and attachment of the molding with the window panel. The durometer of the outer member is selected to provide and assure a desired level of flexibility and resilience for yieldable sealing contact between the outer member and the window panel and the body panel. For example, the inner member may have a durometer of approximately 80 and the outer member a durometer of approximately 30.

Thus it is seen that the invention provides a new and improved reveal molding for closing and concealing the space between a window panel and a flanged vehicle body opening.

The embodiments of the invention in which an exclusive property or privilege is claimed are defined as follows:

1. A motor vehicle window molding installation having a molding for concealing a space between a flanged vehicle body panel and an edge of a window panel mounted on the body panel flange by a curable adhesive, said molding comprising, a C-shaped inner member of high durometer extrudable plastic material fitted onto the edge of the window panel and having spaced apart legs which forcibly grip the opposed faces of the window panel and a base connecting the legs;

and an outer member of low durometer extrudable plastic material coextruded onto the inner member, said outer member having a C-shaped channel portion encapsulating the C-shaped inner member and a continuous flexible lip extruded integral therewith and extending therefrom in a free state as molded in a direction generally coplanar with an outer surface of the window panel, said flexible lip being effective upon mounting of the window panel upon the body panel flange for alternative flexured orientation to extend into self-biasing overlying watertight engagement with the body panel outer surface to bridge across a space between the window panel and the body panel and alternatively flexured to extend inwardly within said space in a folded self-biasing watertight engagement with the flange of the body panel to define in either of the alternative orientations a water conducting drain channel between the molding and the vehicle body panel.

* * * * *